US011975366B2

(12) United States Patent
Jha et al.

(10) Patent No.: US 11,975,366 B2
(45) Date of Patent: *May 7, 2024

(54) PRE-LOADED FLOOR WIPES WITH IMPROVED PICKUP

(71) Applicant: The Clorox Company, Oakland, CA (US)

(72) Inventors: Ashish K. Jha, Pleasanton, CA (US); Nikhil P. Dani, Pleasanton, CA (US); David R. Scheuing, Danville, CA (US); Nancy A. Falk, Bath, ME (US); Bryan K. Parrish, Pleasanton, CA (US)

(73) Assignee: THE CLOROX COMPANY, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/987,173

(22) Filed: Nov. 15, 2022

(65) Prior Publication Data

US 2023/0078098 A1 Mar. 16, 2023

Related U.S. Application Data

(60) Continuation of application No. 16/851,335, filed on Apr. 17, 2020, now Pat. No. 11,541,431, which is a (Continued)

(51) Int. Cl.

| | |
|---|---|
| ***B08B 1/14*** | (2024.01) |
| ***C11D 17/04*** | (2006.01) |
| *A47L 13/20* | (2006.01) |

(52) U.S. Cl.

CPC ............ *B08B 1/143* (2024.01); *C11D 17/049* (2013.01); *A47L 13/20* (2013.01)

(58) Field of Classification Search

CPC ........... B08B 1/006; B08B 1/007; B08B 3/04; C11D 17/04; C11D 17/049; A46B 5/04;

(Continued)

(56) References Cited

U.S. PATENT DOCUMENTS 3,929,678 A 12/1975 Laughlin et al.
4,259,217 A 3/1981 Murphy (Continued)

FOREIGN PATENT DOCUMENTS

EP 0750062 A1 12/1996
EP 0857453 A1 8/1998

(Continued)

OTHER PUBLICATIONS

Non-Final Office Action received for U.S. Appl. No. 16/851,335, dated Apr. 12, 2022, 12 pages.

(Continued)

*Primary Examiner* — Robert J Scruggs
(74) *Attorney, Agent, or Firm* — Workman Nydegger

(57) ABSTRACT

A pre-loaded cleaning substrate, and related systems and methods for picking up particles with an aspect ratio (L/D) greater than 300 (e.g., hair), or greater than 1200 (e.g., particularly long hairs). The substrate (e.g., a nonwoven) may include only a single layer of material. The pre-loaded substrate is loaded (e.g., during manufacture) with a cleaning composition. The fibers of the substrate may have an average diameter less than 15 μm, the substrate may have an air permeability of 35 $ft^3$/min to 75 $ft^3$/min, and the liquid cleaning composition may have a surface tension of less than about 50 dynes/cm. Together, the combination of the particular substrate and cleaning composition may facilitate markedly improved ability to pick up high L/D aspect ratio particle debris (e.g., such as hair), while retaining such particles (e.g., providing hair retention index values of at least 20).

16 Claims, 9 Drawing Sheets

Related U.S. Application Data division of application No. 15/964,800, filed on Apr. 27, 2018, now Pat. No. 10,843,233.

(58) Field of Classification Search
CPC . A46B 2200/1066; A47L 13/10; A47L 13/16; A47L 13/17; A47L 13/20; A47L 13/22; A47L 13/26; A47K 11/10; A47K 7/03
See application file for complete search history.

(56) References Cited

U.S. PATENT DOCUMENTS

| | | | |
|---|---|---|---|
| 6,202,845 B1 | 3/2001 | Hill | |
| 6,825,158 B2 | 11/2004 | Mitra et al. | |
| 8,648,027 B2 | 2/2014 | Mitchell et al. | |
| 9,006,165 B2 | 4/2015 | Mitchell et al. | |
| 9,234,165 B2 | 1/2016 | Hope et al. | |
| 10,843,233 B2 * | 11/2020 | Jha | C11D 17/04 |
| 11,433,431 B2 * | 9/2022 | Jha | B08B 1/00 |
| 11,541,431 B2 * | 1/2023 | Jha | C11D 17/049 |
| 2003/0003832 A1 | 1/2003 | Childs et al. | |
| 2003/0044569 A1 * | 3/2003 | Kacher | A47L 25/08 15/228 |
| 2004/0111817 A1 * | 6/2004 | Chen | B32B 3/28 15/104.93 |
| 2004/0163674 A1 | 8/2004 | Policicchio et al. | |
| 2005/0022843 A1 | 2/2005 | Policicchio et al. | |
| 2005/0076936 A1 | 4/2005 | Pung et al. | |
| 2007/0179079 A1 * | 8/2007 | Kilkenny | C11D 3/3776 510/499 |
| 2008/0003906 A1 | 1/2008 | Hill et al. | |
| 2009/0087475 A1 | 4/2009 | Sheehan | |
| 2010/0306946 A1 | 12/2010 | Pung et al. | |
| 2012/0064280 A1 | 3/2012 | Hammons et al. | |
| 2012/0184933 A1 | 7/2012 | Floeter et al. | |
| 2012/0246851 A1 | 10/2012 | Smith et al. | |
| 2013/0111682 A1 * | 5/2013 | Pung | A47L 13/10 15/118 |
| 2014/0053870 A1 * | 2/2014 | Tuman | D04H 3/14 15/209.1 |
| 2014/0289985 A1 | 10/2014 | Hoying et al. | |
| 2015/0000059 A1 | 1/2015 | McConaughy et al. | |
| 2015/0086659 A1 | 3/2015 | Klofta et al. | |
| 2015/0223662 A1 | 8/2015 | Doherty-Stapp et al. | |
| 2016/0115430 A1 | 4/2016 | Swanson et al. | |
| 2016/0120387 A1 | 5/2016 | Deleersnyder et al. | |
| 2017/0000308 A1 | 1/2017 | Policicchio | |
| 2017/0022660 A1 | 1/2017 | Suer et al. | |
| 2017/0095132 A1 | 4/2017 | Tollens et al. | |
| 2017/0095133 A1 | 4/2017 | Hoying et al. | |
| 2017/0095134 A1 | 4/2017 | Hoying et al. | |
| 2017/0095135 A1 | 4/2017 | Hoying et al. | |
| 2017/0096623 A1 | 4/2017 | Tollens et al. | |
| 2017/0096626 A1 | 4/2017 | Tollens et al. | |
| 2017/0164808 A1 | 6/2017 | Bao et al. | |
| 2017/0166847 A1 | 6/2017 | Bao et al. | |
| 2017/0181595 A1 | 6/2017 | Hoying et al. | |
| 2017/0311592 A1 | 11/2017 | Napolitano et al. | |
| 2020/0238341 A1 | 7/2020 | Jha et al. | |
| 2020/0360971 A1 | 11/2020 | Jha et al. | |

FOREIGN PATENT DOCUMENTS

| | | |
|---|---|---|
| WO | 99/37476 A1 | 7/1999 |
| WO | 01/23510 A2 | 4/2001 |
| WO | 01/79599 A2 | 10/2001 |
| WO | 02/36339 A2 | 5/2002 |
| WO | 03/00108 A1 | 1/2003 |
| WO | 03/31557 A1 | 4/2003 |
| WO | 03/31558 A1 | 4/2003 |
| WO | 2004/041051 A2 | 5/2004 |
| WO | 2004/044296 A2 | 5/2004 |
| WO | 2004/110239 A2 | 12/2004 |
| WO | 2007/057866 A2 | 5/2007 |
| WO | 2016/161234 A1 | 10/2016 |
| WO | 2016/161235 A1 | 10/2016 |

OTHER PUBLICATIONS

Non-Final Office Action received for U.S. Appl. No. 16/851,418, dated Apr. 13, 2022, 18 pages.

Notice of Allowance received for U.S. Appl. No. 16/851,335, dated Aug. 17, 2022, 8 pages.

Notice of Allowance received for U.S. Appl. No. 16/851,335, dated Dec. 2, 2022, 3 pages.

Notice of Allowance received for U.S. Appl. No. 16/851,418, dated Jul. 6, 2022, 8 pages.

* cited by examiner

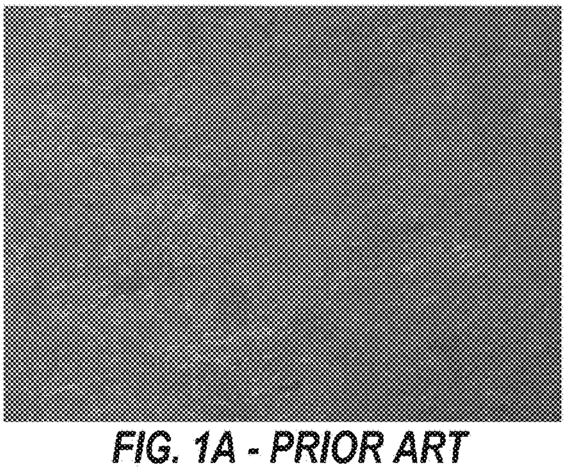
FIG. 1A - PRIOR ART
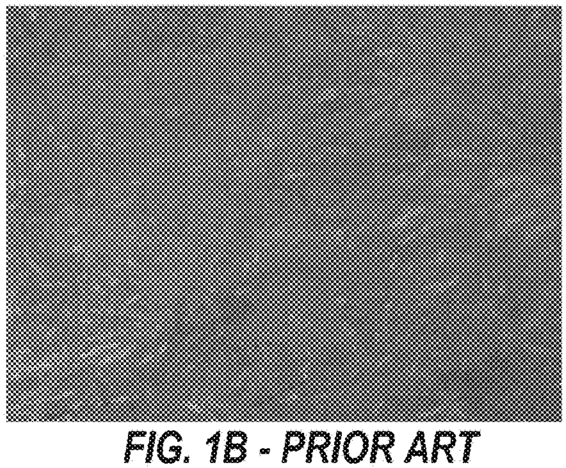
FIG. 1B - PRIOR ART
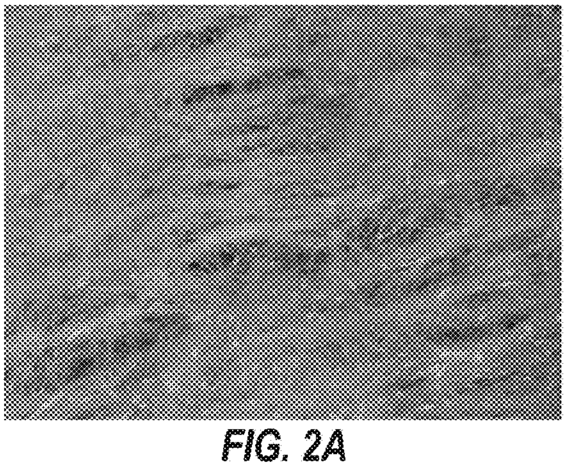
FIG. 2A
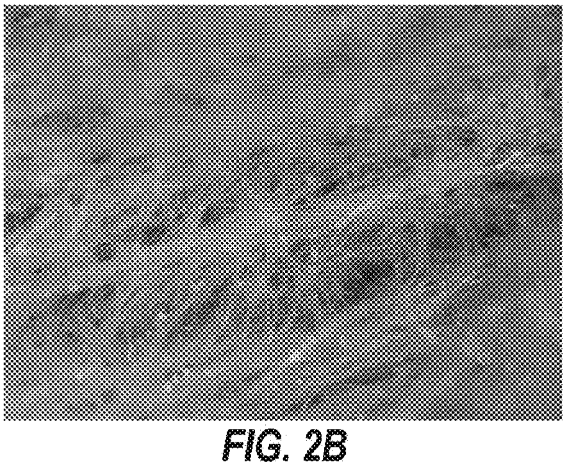
FIG. 2B
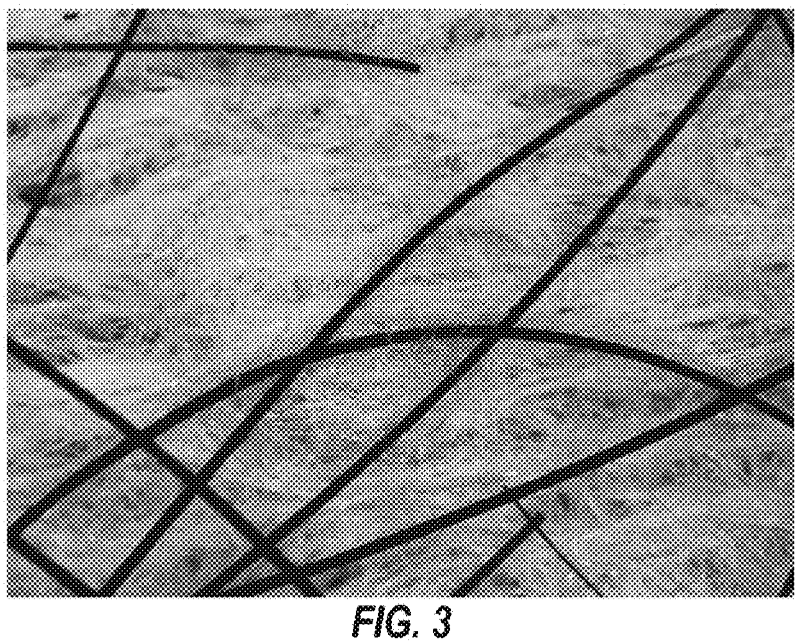
FIG. 3

FIG. 14A
FIG. 14B
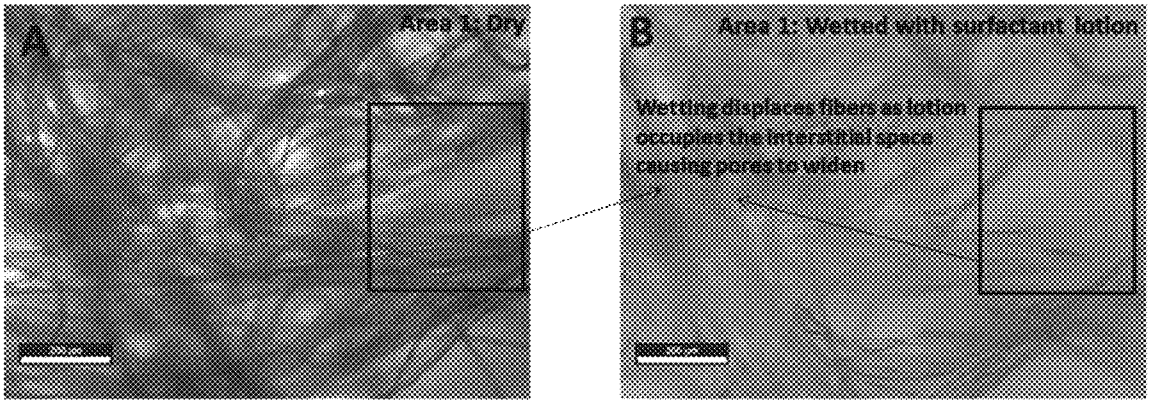
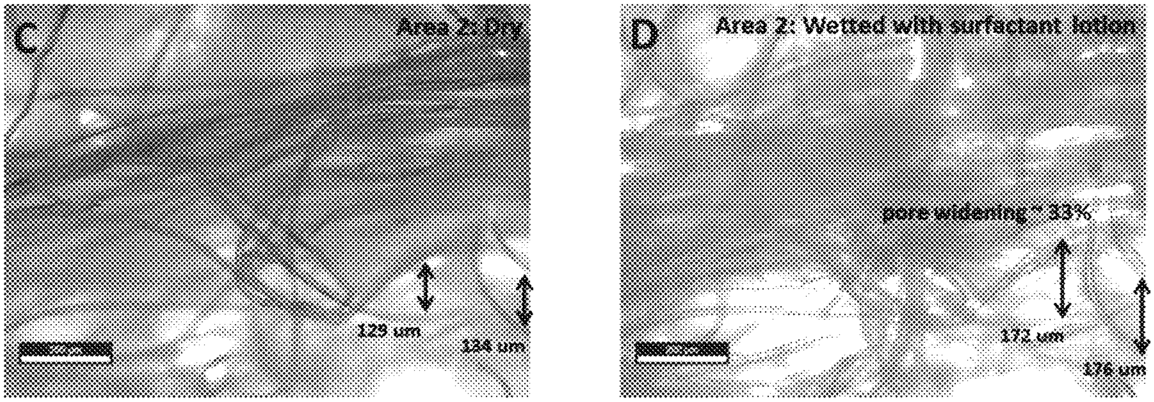
FIG. 14C
FIG. 14D
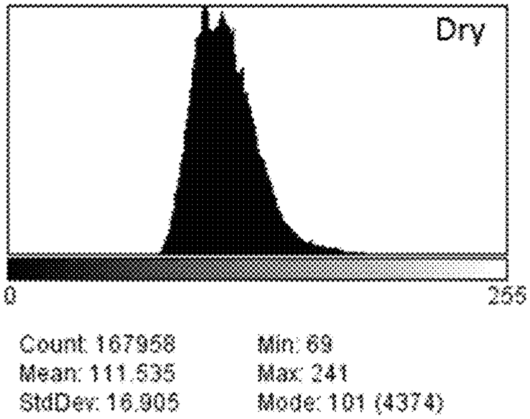
FIG. 15A
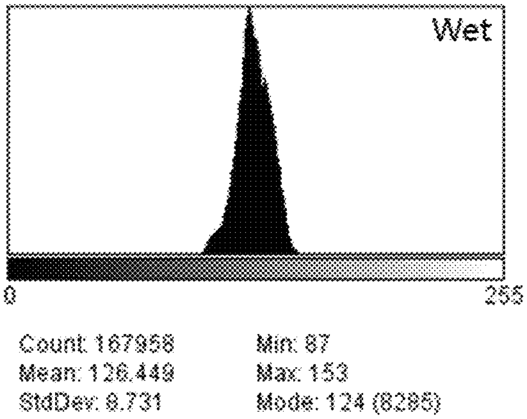
FIG. 15B

PRE-LOADED FLOOR WIPES WITH IMPROVED PICKUP

CROSS-REFERENCE TO RELATED APPLICATIONS

The present application is a continuation of U.S. patent application Ser. No. 16/851,335, filed Apr. 17, 2020, which is a divisional of U.S. patent application Ser. No. 15/964,800, filed Apr. 27, 2018, the disclosure of each of which is incorporated herein in its entirety.

BACKGROUND OF THE INVENTION

1. The Field of the Invention

The present invention relates to cleaning substrates, systems, and methods for cleaning hard surfaces.

2. Description of Related Art

Pre-loaded floor pads for cleaning hard floor surfaces are available, e.g., such as that provided under the tradename SWIFFER, as well as numerous other systems. Many such systems are tailored to tackling tough dirt and grime by including a substrate that includes multiple layers or regions, each configured to provide particular cleaning characteristics. While existing floor cleaning pads are quite useful, they exhibit some drawbacks, such as poor pick up of debris with high L/D aspect ratios, such as hairs, particularly long hairs. While existing systems including multiple layers may be effective in some circumstances, such complex systems result in increased manufacturing costs, are not particularly adept at picking up particles having high aspect ratios, and exhibit other disadvantages. As such, there is a need for improved hard surface cleaning substrates, systems and methods.

BRIEF SUMMARY

Applicant has surprisingly found that particular combinations of a pre-loaded cleaning substrate having particular basis weight characteristics, air permeability characteristics, stiffness characteristics, fiber diameter characteristics, and/or surface roughness characteristics, coupled with a cleaning composition also having particular characteristics (e.g., relative to surface tension and the like) results in the ability to pick up high aspect ratio particles, such as hair, particularly long hairs having L/D aspect ratios of at least 300, at least 1200, or at least 3000. The present invention thus relates to pre-loaded cleaning substrates, and related systems and methods for cleaning hard surfaces, such as floors, where such high aspect ratio particle pick up is possible.

One aspect of the invention is directed to a method for cleaning a surface (e.g., a floor) comprising the steps of providing a cleaning implement that includes a handle, a cleaning head attachable to the handle, and a disposable cleaning substrate pre-loaded with a cleaning composition. In the method, the disposable cleaning substrate is attached (or provided pre-attached) to the cleaning head. The user mops the surface to be cleaned with the cleaning substrate, to pick up more than 60% (e.g., by weight) of particles with a L/D aspect ratio of at least 1200, or at least 3000 onto the substrate. The cleaning substrate may be removed from the cleaning head after the surface has been mopped, e.g., for disposal.

Another aspect of the present invention is directed to a cleaning and particle removal system. Such system may include a cleaning implement having a handle, a cleaning head attachable to the handle and configured to receive a cleaning substrate, and a disposable cleaning substrate attachable to the cleaning head. The system also includes a cleaning composition including a solvent (e.g., water) and a surface tension modifier (e.g., a surfactant and/or solvent). The cleaning composition is loaded onto or into the substrate to form a pre-loaded cleaning substrate that has retention index of at least 20, and a surface tension of less than 50 dynes/cm, which enables particle pick up, adhesion and retention of particles with an L/D aspect ratio greater than 3000, to the pre-loaded cleaning substrate. Here retention index is a qualitative measure of strength of particle-substrate adhesion measured by number of vertical shakes of mop-head to make the bulk of particles detach and fall off the substrate.

Another aspect of the present invention is directed to a pre-loaded cleaning substrate including a substrate with a basis weight greater than 100 $g/m^2$ and a dry-substrate air permeability greater than 45 $ft^3/min$ (e.g., from 46 $ft^3/min$ to 75 $ft^3/min$). Also included is a cleaning composition loaded onto or into the substrate (e.g., during manufacture), where the cleaning composition includes water and a surface tension modifier (e.g., a surfactant and/or solvent). The substrate itself comprises fibers (e.g., a nonwoven substrate) with a fiber diameter of about 10 μm to 15 μm. The pre-loaded cleaning substrate is able to pick up more than 60%, or more than 80% of particles with a L/D aspect ratio of at least 3000.

Further features and advantages of the present invention will become apparent to those of ordinary skill in the art in view of the detailed description of preferred embodiments below.

BRIEF DESCRIPTION OF THE DRAWINGS

To further clarify the above and other advantages and features of the present invention, a more particular description of the invention will be rendered by reference to specific embodiments thereof which are illustrated in the drawings located in the specification. It is appreciated that these drawings depict only typical embodiments of the invention and are therefore not to be considered limiting of its scope. The invention will be described and explained with additional specificity and detail with the accompanying drawings.

FIGS. 1A-1B are optical microscope images of a wet mopping pad of a commercially available product, showing the relatively flat, smooth, and dense texture of exposed faces thereof.

FIGS. 2A-2B are optical microscope images of an exemplary substrate according to the present invention, showing the significantly more "open" texture thereof.

FIG. 3 is an optical microscope image of the substrate of FIGS. 2A-2B, showing how hairs become entangled in the fibers of the substrate, because of the "open", "wavy", "loopy" texture of the substrate.

FIGS. 14A-14D are microscope images of the same region of substrate A tested dry and wet with surfactant lotion [A] showing the interaction between groups of fibers and the surfactant lotion [A].

FIGS. 15A-15B show histograms of grayscale values for the images from FIG. 14A, dry substrate, and FIG. 14B wet substrate.

DETAILED DESCRIPTION OF THE PREFERRED EMBODIMENTS

I. Definitions

Figure 4:
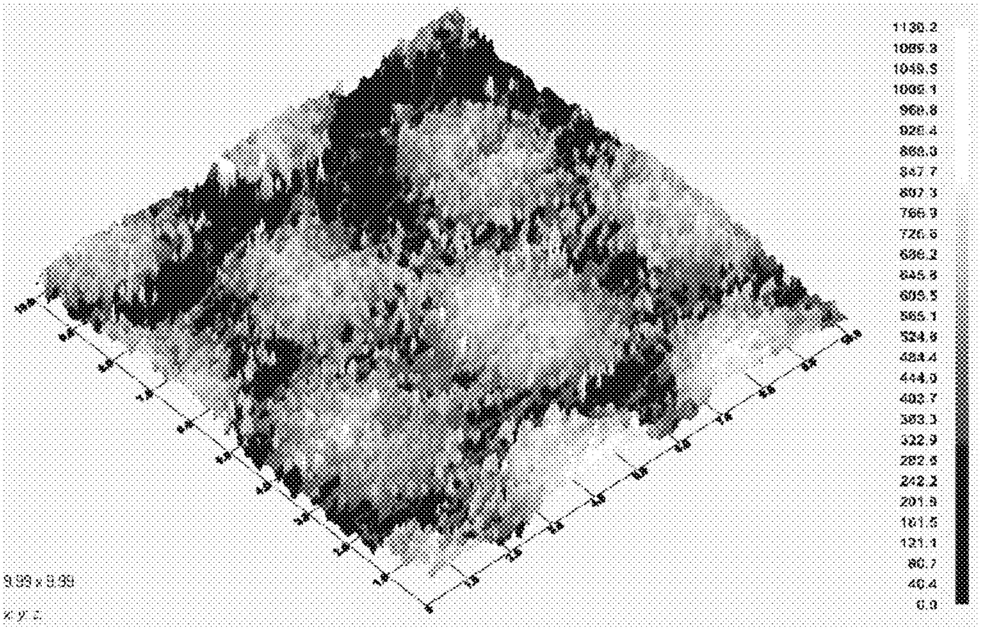
FIG. 4 is a 3D profilometry scan of the substrate of FIGS. 2A-2B, showing the surface roughness of the exposed face thereof.

Before describing the present invention in detail, it is to be understood that this invention is not limited to particularly exemplified systems or process parameters that may, of course, vary. It is also to be understood that the terminology used herein is for the purpose of describing particular embodiments of the invention only, and is not intended to limit the scope of the invention in any manner.

All publications, patents and patent applications cited herein, whether supra or infra, are hereby incorporated by reference in their entirety to the same extent as if each individual publication, patent or patent application was specifically and individually indicated to be incorporated by reference.

The term "comprising" which is synonymous with "including," "containing," or "characterized by," is inclusive or open-ended and does not exclude additional, unrecited elements or method steps.

The term "consisting essentially of" limits the scope of a claim to the specified materials or steps "and those that do not materially affect the basic and novel characteristic(s)" of the claimed invention.

The term "consisting of" as used herein, excludes any element, step, or ingredient not specified in the claim.

It must be noted that, as used in this specification and the appended claims, the singular forms "a," "an" and "the" include plural referents unless the content clearly dictates otherwise. Thus, for example, reference to a "surfactant" includes one, two or more surfactants.

Unless otherwise stated, all percentages, ratios, parts, and amounts used and described herein are by weight.

Numbers, percentages, ratios, or other values stated herein may include that value, and also other values that are about or approximately the stated value, as would be appreciated by one of ordinary skill in the art. As such, all values herein are understood to be modified by the term "about". A stated value should therefore be interpreted broadly enough to encompass values that are at least close enough to the stated value to perform a desired function or achieve a desired result, and/or values that round to the stated value. The stated values include at least the variation to be expected in a typical manufacturing process, and may include values that are within 10%, within 5%, within 1%, etc. of a stated value. Furthermore, where used, the terms "substantially", "similarly", "about" or "approximately" represent an amount or state close to the stated amount or state that still performs a desired function or achieves a desired result. For example, the term "substantially" "about" or "approximately" may refer to an amount that is within 10% of, within 5% of, or within 1% of, a stated amount or value.

Some ranges may be disclosed herein. Additional ranges may be defined between any values disclosed herein as being exemplary of a particular parameter. All such ranges are contemplated and within the scope of the present disclosure.

In the application, effective amounts are generally those amounts listed as the ranges or levels of ingredients in the descriptions, which follow hereto. Unless otherwise stated, amounts listed in percentage ("%'s") are in weight percent (based on 100% active) of any composition.

The phrase 'free of' or similar phrases if used herein means that the composition or article comprises 0% of the stated component, that is, the component has not been intentionally added. However, it will be appreciated that such components may incidentally form thereafter, under some circumstances, or such component may be incidentally present, e.g., as an incidental contaminant.

The phrase 'substantially free of' or similar phrases as used herein means that the composition or article preferably comprises 0% of the stated component, although it will be appreciated that very small concentrations may possibly be present, e.g., through incidental formation, contamination, or even by intentional addition. Such components may be present, if at all, in amounts of less than 1%, less than 0.5%, less than 0.25%, less than 0.1%, less than 0.05%, less than 0.01%, less than 0.005%, or less than 0.001%. In some embodiments, the compositions or articles described herein may be free or substantially free from any components not mentioned within this specification.

As used herein, "disposable" is used in its ordinary sense to mean an article that is disposed or discarded after a limited number of usage events, preferably less than 25, more preferably less than about 10, and most preferably less than about 2 entire usage events. The substrates disclosed herein are typically disposable.

As used herein, the term "substrate" is intended to include any material that is used to clean an article or a surface. Examples of cleaning substrates include, but are not limited to, wipes, mitts, sponges, pads, or a single sheet of material which is used to clean a surface and, e.g., which can be attached to a cleaning implement, such as a floor mop, handle, or a hand held cleaning tool, such as a toilet cleaning device. The substrates may typically be in the form of a wipe. Such substrates or wipes may be attachable to a given cleaning tool, e.g., where the wipes or other substrates attachable thereto may be used for their useful life, and then disposed of, and replaced with another.

As used herein, the term "fibrous layer" means a web having a structure of individual fibers or threads which are interlaid, in an identifiable manner as in a knitted or woven layer or not in an identifiable manner as in a nonwoven layer. The examples herein may generally include a fibrous layer that is nonwoven. Nonwoven layers have been formed from many processes, such as, for example, carded, airlaid, wet-laid, spunbond, meltblown, hydroentangled, hydrospun, thermal bonded, air-through bonded, needled, chemical bonded, and latex bonded web processes. The basis weight of nonwoven webs or rolls is often expressed in grains per square meter (gsm) and the fiber diameters useful are usually expressed in microns, or in the case of staple fibers, sometimes denier.

The terms "wipe" "substrate", and "fibrous layer" may thus overlap in meaning, and while "wipe" or "substrate" may typically be used herein for convenience, it will be appreciated that these terms may often be interchangeable.

As used herein, "wiping" refers to any shearing action that the wipe or other substrate undergoes while in contact with a target surface. This includes substrate-implement motion over a surface, and may also include any perturbation of the substrate via energy sources such as ultrasound, mechanical vibration, electromagnetism, and so forth.

As used herein, the term "fiber" includes both staple fibers, i. e., fibers that have a defined length between 2 mm and 20 mm, fibers longer than staple fibers but are not continuous, as well as continuous fibers, which are sometimes called "continuous filaments" or simply "filaments". The method in which the fiber is prepared may affect whether the fiber is a staple fiber or a continuous filament.

As used herein, the term "percentage hair pick up rate" "hair pick up rate" and the like refers to the percentage of hairs (by weight) that a substrate picks up in a given area (e.g. 10-square-feet) over which a fixed amount (in grains) of hair strands of a given length and/or aspect ratio are scattered randomly. For example, the amount of hair used in the experiments described in the present application was about 0.5 grains.

As used herein, the term "hair retention index" "retention index" and the like refers to the number of vertical shakes of mop-head needed to make the bulk of the hairs detach and fall off the substrate after a substrate initially picks up the hairs, under controlled conditions. Typically, how well hair is picked up and retained by a substrate is a qualitative analysis. The hair retention index enabled Applicant to create a quantitative measurement used to evaluate the capability of the substrate to retain hairs that are picked up by the substrate initially. A higher hair retention index means that the substrate has a greater capability to retain hairs that are picked up by the substrate. The retention index also allowed Applicant to effectively compare particle pick up performance for different types of substrates in a quantitative manner.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

II. Introduction

In an aspect, the present invention is directed to a pre-loaded cleaning substrate, systems including such substrates, and associated methods, where the substrate includes one or more characteristics that Applicant has found to correlate to improved particle pick up and retention ability, especially particles with L/D aspect ratios greater than 300, or greater than 1200, such as long hairs. For example, many existing mopping systems cannot efficiently pick up hairs, especially long hairs. Even where a small percentage of hairs may be picked up by existing systems, the initially picked-up hairs are often not retained long term on the substrate, but will fall off as the substrate is lifted and moved. The present invention may advantageously provide for increased hair pick up rate and increased hair retention index.

III. Exemplary Wipes

FIGS. 1A-1B illustrate a currently available floor cleaning product (i.e., SWIFFER SWEEPER® Wet Mopping Cloths) in which the substrate has a relatively flat and smooth texture. FIGS. 2A-2B illustrate an exemplary wipe substrate for use in the present invention, which may be dosed with a cleaning composition. The substrate illustrated in FIGS. 2A-2B may be formed as a single layer of homogeneous composition, with an open, wavy and loopy texture, as shown.

The wipe or other disposable cleaning substrate described herein may typically be used as a pre-moistened substrate. Dosing of the substrate may be achieved during manufacture, where the dosed substrate may be provided in a sealed condition, ready for use. Alternatively, dosing may be achieved by the user, e.g., at the time of use (e.g., by activating a pump or trigger to dose the substrate with the cleaning composition, or the like at the time of use). The substrate may typically be attached to a cleaning implement (e.g., a handle) at the time of use.

a. Fiber Characteristics

The exemplary substrate includes fibers, which may include pulp fibers and/or synthetic fibers. Synthetic fibers may include various polyolefins or other fibers formed from synthetic polymers, e.g., polyethylene, polypropylene, PET, PVC, polyacrylics, polyvinyl acetates, polyvinyl alcohols, polyamides, polystyrenes, or the like. In conducting extensive experiments, Applicant has discovered several fiber characteristics of the substrate that correlate to improved results relative to pick up of high aspect ratio particles. The combination of characteristics discovered by Applicant differ significantly from the characteristics exhibited by substrates used in existing floor cleaning products, such as those available from SWIFFER®, GREAT VALUE™, and PINE-SOL® Wet Floor Wipes.

In one embodiment, the fiber composition of the exemplary substrate may include a significant fraction of viscose. For example, the substrate may comprise at least 20%, at least 30%, at least 35%, at least 40%, at least 50%, at least 55%, at least 60%, from 20% to 85%, from 30% to 75%, or from 50% to 70% viscose or lyocell. The substrate may comprise PET. For example, at least 5%, at least 10%, at least 15%, from 10% to 50%, from 10% to 40%, or from 20% to 30% of the substrate may comprise PET. The substrate may comprise polypropylene (PP). For example, at least 5%, at least 10%, from 5% to 50%, from 5% to 40%, or from 10% to 20% of the substrate may comprise polypropylene. In an embodiment, all fibers of the substrate may be synthetic (i.e., no pulp present). A specific example may include about 62.4% viscose or lyocell, 26.1% PET, and 11.5% PP.

The average diameter of the fibers of the substrate may be less than 15 μm, e.g., from about 10 μm to 15 μm. The total percentage porosity of the exemplary substrate may be at least 85%, e.g., from 85% to 90%. The density of the exemplary substrate may be less than 0.1 g/cm$^3$, e.g., from 0.8 g/cm$^3$ to 0.95 g/cm$^3$.

Table 1 below shows fiber and substrate characteristics, as well as performance characteristics for substrates useful according to the present invention, as compared to several existing cleaning substrates.

TABLE 1

| Sample | Substrate A | SWIFFER SWEEPER ® Wet Mopping Cloths (Substrate B) | Great Value ™ Disinfecting Wet Mopping Cloths (Substrate C) | PINE-SOL ® Wet Floor Wipes (Substrate D) |
|---|---|---|---|---|
| Basis Weight (g/m$^2$) | 120 | 200 | 150 | 130 |
| Substrate Composition | 62.4% Cellulose (lyocell) 26.1% PET 11.5% PP | 44.4% Cellulose 3.5% PET 52.1% PP | 6.6% Cellulose 63.8% PET 29.6% PP | 43.4% Cellulose 22.6% PET 34% PP |
| Average Fiber Diameter** (μm) | 11.84 ± 1.65 | 16.87 ± 2.85 | 24.67 ± 6.02 | 20.63 ± 7.25 |
| Structure | Single layer | 3-layers | 2-layers | Single layer |
| Total % Porosity | 88.47 | 84.1 | 75.1 | 84.9 |
| Avg. Surface Roughness (μm) ±SDev. | 479.6 ± 188.0 | 314.5 ± 149.3 | 371.9 ± 150.7 | 366.5 ± 127.2 |
| Caliper Thickness (mm) | 1.29 ± 0.02 | 2.31 ± 0.02 | 1.32 ± 0.02 | 1.18 ± 0.02 |
| Density (g/cm$^3$) | 0.093 | 0.0866 | 0.1136 | 0.1102 |
| Loading Ratio | 7.8 | 7.8 | 4.4 | 4.6 |
| Stiffness (mg · cm) | 357 | 3465 | 1903 | 5057 |
| Air Permeablity (ft$^3$/min) | 56.57 | 30.33 | 45.37 | 30.93 |
| Fine Particle Pick Up (Vacuum Dust) | High | High | High | High |
| Coarse Particle Pick Up (Sand) | Medium | Low | High | Low |
| Pick Up of L/D Aspect Ratio = 300 | High | High | High | High |
| Pick Up of L/D Aspect Ratio = 1200 | High | Low | Low-Medium | Low |
| Pick Up of L/D Aspect Ratio = 3000 | High (84%) | Low (~1%) | Medium (~52%) | Low (~1%) |

Average fiber diameter as reported is based on measurements of at least 100 such fibers of each particular substrate. The labels of "high", "medium" and "low" particle pick up are relative to a standard in which "low" represents pick up of 0-35% of the particles by weight; "medium" represents pick up of greater than 35 to 70% of the particles by weight; and "high" represents pick up of greater than 70% of the particles by weight.

It will be apparent that there are significant differences between the substrate, its efficacy, as compared to the comparative systems. For example, fiber composition, fiber diameter, porosity, air permeability, surface roughness and stiffness all differ significantly from the characteristics used in existing floor cleaning systems.

The particular combination of characteristics result in a particularly advantageous texture and structure to the substrate that is different from existing floor cleaning substrates, and that performs significantly better than the existing cleaning substrates when tested for ability to pick up and retain particles of high aspect ratio.

FIG. 3 shows a microscope image of the substrate of FIGS. 2A-2B, showing how such high aspect ratio hairs become entangled in the fibers present at the exposed faces of the substrate. The loopy, open, wavy surface texture provided by the open, highly porous nonwoven fiber structure entangles and holds the hairs within the fibrous matrix of the exemplary substrate. In contrast, the substrates seen in FIGS. 1A-1B are far more flat and smooth, so as to not readily entangle with the hair.

Applicants have conducted extensive testing to identify various characteristics that correlate to improved hair pick up rate and/or hair retention index. As a result of such testing, Applicant has discovered significant relationships between such desired performance characteristics and physical characteristics including, but not limited to, air permeability of the substrate, surface roughness of the substrate, basis weight of the substrate. Applicant also found that the characteristics of the cleaning composition also affect performance characteristics of hair pick up rate and retention index.

b. Surface Roughness Characteristics

Figure 5:
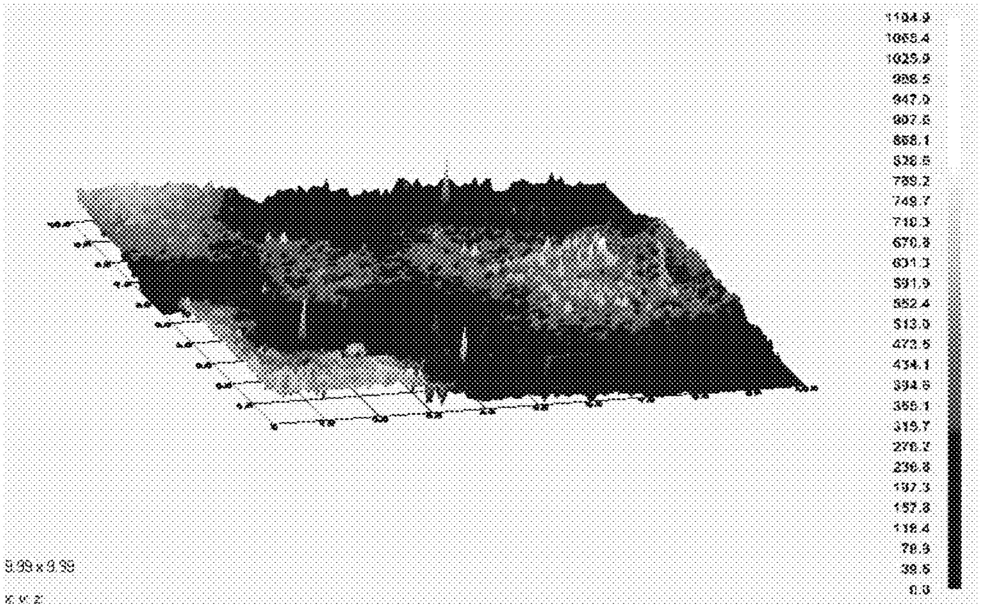
FIG. 5 is a 3D profilometry scan of the substrate of FIGS. 1A-1B.
Figure 6:
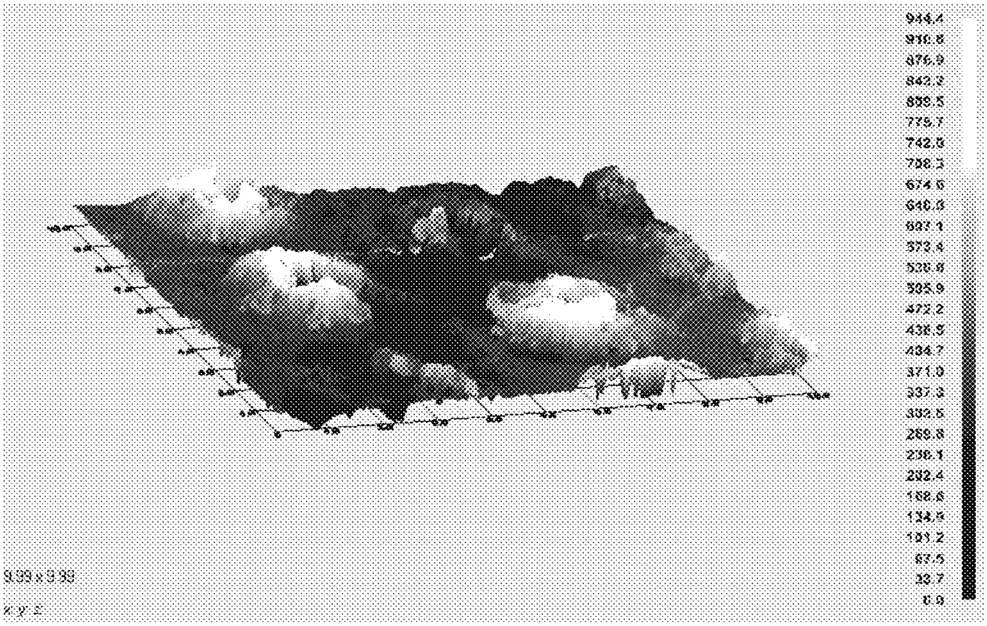
FIG. 6 is a 3D profilometry scan of another substrate (substrate C in the comparative Examples).
Figure 7:
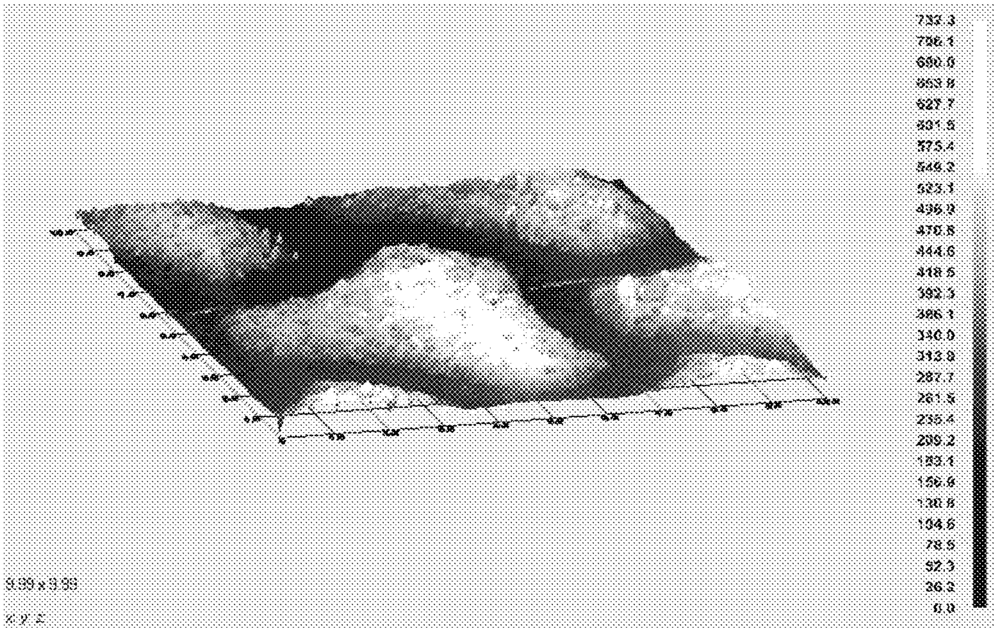
FIG. 7 is a 3D profilometry image of another substrate (substrate D in the comparative Examples).

Substrates have a bulk profile thickness, which bulk thickness may be measured on the bulk scale using calipers. Substrates also exhibit certain surface roughness characteristics across the given substrate surface on a micro, rather than the bulk, macro-scale. For example, when measured not on a bulk scale, but using a profile-o-meter, e.g., which can be used to chart profile height for any given distance across the substrate, the profile height includes peaks and valleys across the surface, as the surface is typically not uniformly flat. Such profile-o-meter measurements can indicate something of the surface roughness of the substrate surface. FIGS. 4-7 illustrate surface profiles of the exemplary substrates of Table 1. FIG. 4 illustrates the profile for Substrate A (also seen in FIGS. 2A-2B). FIG. 5 illustrates the profile for substrate B (also seen in FIGS. 1A-1B), FIG. 6 illustrates the profile for substrate C of Table 1, and FIG. 7 illustrates the profile for substrate D of Table 1. Any profile-o-meter (e.g., such as those commercially available) may be used for such measurements. The relatively high surface roughness of substrate A is also apparent from FIGS. 2A, 2B and 3, where the wavy, loopy, open surface texture are apparent. Surface roughness is quantified by the deviation in the direction of the normal vector of the bulk substrate from an ideal horizontal plane. The higher the roughness value, the rougher the surface.

For easy reference, Table 2 below repeats the profile height and surface roughness characteristics of substrates A-D from Table 1.

TABLE 2

| Sample | Substrate A | SWIFFER SWEEPER ® Wet Mopping Cloths (Substrate B) | Great Value ™ Disinfecting Wet Mopping Cloths (Substrate C) | PINE-SOL ® Wet Floor Wipes (Substrate D) |
|---|---|---|---|---|
| Caliper Thickness (mm) | 1.29 ± 0.02 | 2.31 ± 0.02 | 1.32 ± 0.02 | 1.18 ± 0.02 |
| Avg. Surface Roughness (μm) ±SDev. | 479.6 ± 188.0 | 314.5 ± 149.3 | 371.9 ± 150.7 | 366.5 ± 127.2 |

From Table 2, it is apparent that the exemplary substrate (Substrate A) has greater surface roughness as compared to comparative floor cleaning substrates B-D.

As seen in FIGS. 4-7 and Tables 1 and 2, substrate A has an average surface roughness of 479 μm, relative to a bulk caliper thickness of 1.29 mm, substrate B has an average surface roughness of 314 μm, relative to a bulk caliper thickness of 2.31 mm Substrate C had an average surface roughness of 371 μm, relative to a bulk caliper thickness of 1.32 mm, and substrate D had an average surface roughness of 366 μm, relative to a bulk caliper thickness of 1.18 mm.

Figure 8:
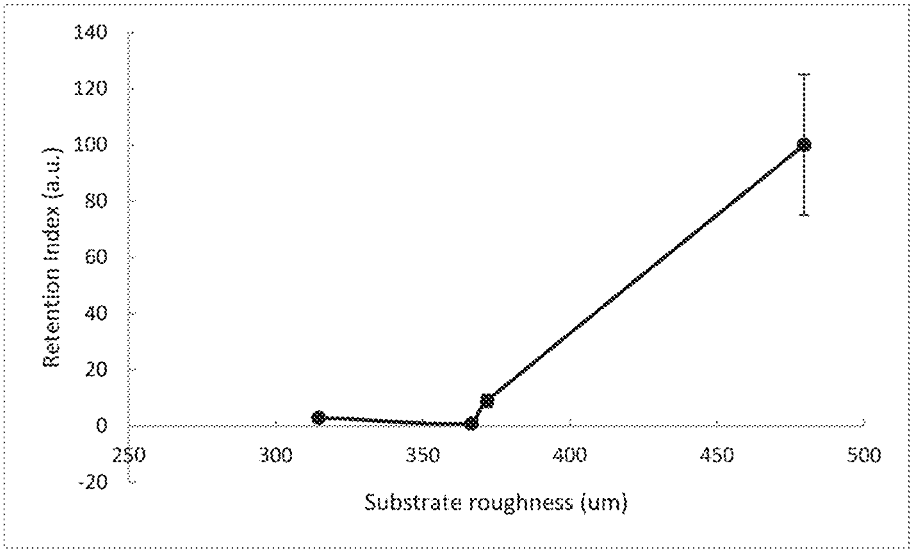
FIG. 8 plots hair retention index as a function of substrate surface roughness.

It is apparent that substrate A has a surface roughness significantly greater than the surface roughness of existing cleaning substrates. Such differences aid in providing better pick up of high aspect ratio particles, and retention of such particles once picked up. FIG. 8 plots the relationship between retention index (how well hairs are retained on the substrate) and surface roughness.

As noted above, hair retention index is a measurement of how many shakes of the substrate or tool are required to cause the picked up hair to fall off the substrate. This test was performed by lifting the mopping head and shaking the head vertically. As shown in FIG. 8, at an average surface roughness of less than 370 μm, the hair retention index is close to 0, meaning the hairs fall off the substrate almost instantly, without any required shaking, but merely upon vertical lifting of the substrate off the floor. At a surface roughness of about 480 μm, the hair retention index is about 100, meaning it takes about 100 shakes to cause the hair to fall off the substrate.

By way of example, the exemplary substrates may have an average surface roughness greater than 400 μm, greater than 425 μm, or greater than 450 μm, e.g., such as from 450 μm to 600 μm, or from 450 μm to 500 μm. Hair retention index may be at least 20, at least 30, at least 50, at least 75, from 20 to 200, from 20 to 100, or from 50 to 100.

c. Air Permeability Characteristics

Figure 9:
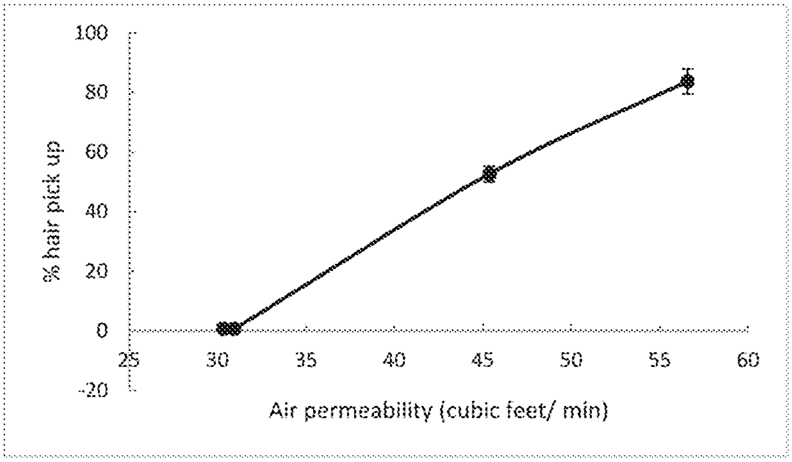
FIG. 9 plots percentage of hair pick up as a function of air permeability of the substrate.
Figure 10:
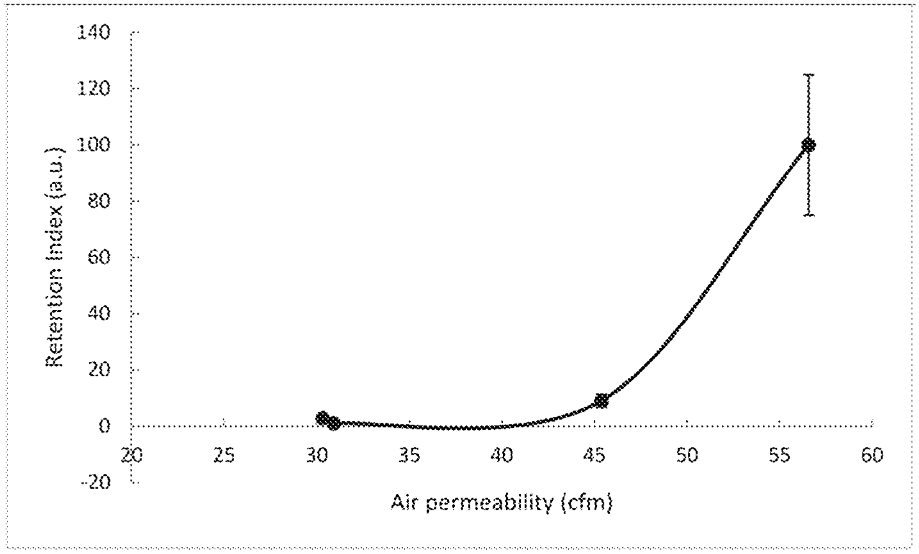
FIG. 10 plots hair retention index as a function of air permeability.

The air permeability of a substrate is a measure of how well the dry substrate allows the passage of air there through. It may be defined as the volume of air (e.g., in cubic feet) that will pass through a given area of the substrate per minute, under a given applied pressure. Various standards are available for measuring air permeability under standardized conditions, e.g., such as ASTM D737-96. Such standards will be apparent to those of skill in the art. As Table 1 shows, there are significant differences between the tested substrates with respect to air permeability. FIGS. 9 and 10 illustrate how air permeability affects percentage hair pick up, as well as hair retention index, respectively.

When air permeability is less than 30 $ft^3$/min, the percentage of hair pick up is near 0%. When air permeability is about 45 $ft^3$/min, the percentage hair pick up rate is about 50%. When the air permeability is above 55 $ft^3$/min, the percentage hair pick up rate is about 80% or better. By way of example, air permeability of the substrate may be at least 35 $ft^3$/min, at least 40 $ft^3$/min, at least 45 $ft^3$/min, greater than 45 $ft^3$/min (e.g., at least 46 $ft^3$/min), at least 50 $ft^3$/min, from 35 $ft^3$/min to 100 $ft^3$/min, from 35 $ft^3$/min to 80 $ft^3$/min, from greater than 45 $ft^3$/min to 70 $ft^3$/min, or from 50 $ft^3$/min to 60 $ft^3$/min.

FIG. 10 illustrates the relationship between air permeability of the substrate and hair retention index. When air permeability is less than 40 $ft^3$/min, the hair retention index is 0, which means the hairs fall off the substrate almost instantly, under influence of gravity alone, without any shaking. At an air permeability of just above 45 $ft^3$/min, the hair retention index is about 10, meaning that it takes about 10 shakes to get the hairs off the substrate. When the air permeability is above about 55 $ft^3$/min, the hair retention index is about 100, meaning it takes about 100 shakes to get the hairs off the substrate.

Air permeability is related to porosity of the substrate. The porosity may be largely driven by the tightness of the fiber packing (e.g., fiber density). Generally, tighter fiber packing results in decreased porosity. Greater air permeability correlates with greater porosity. Table 3 below reproduces the porosity and air permeability values for the substrates seen in Table 1.

TABLE 3

| Sample | Substrate A | SWIFFER SWEEPER ® Wet Mopping Cloths (Substrate B) | Great Value ™ Disinfecting Wet Mopping Cloths (Substrate C) | PINE-SOL ® Wet Floor Wipes (Substrate D) |
|---|---|---|---|---|
| Total % Porosity | 88.47 | 84.1 | 75.1 | 84.9 |
| Air Permeablity ($ft^3$/min) | 56.57 | 30.33 | 45.37 | 30.93 |

According to Table 3, it is apparent that substrate A has a greater total percentage porosity, as well as greater air permeability as compared to substrates B-D. Exemplary air permeability values are given above. Porosity values for the substrate may be at least 85%, greater than 85%, e.g., from 85% to 90%, such as 86%, 87%, 88%, 89%, or 90%.

d. Basis Weight Characteristics

Figure 11:
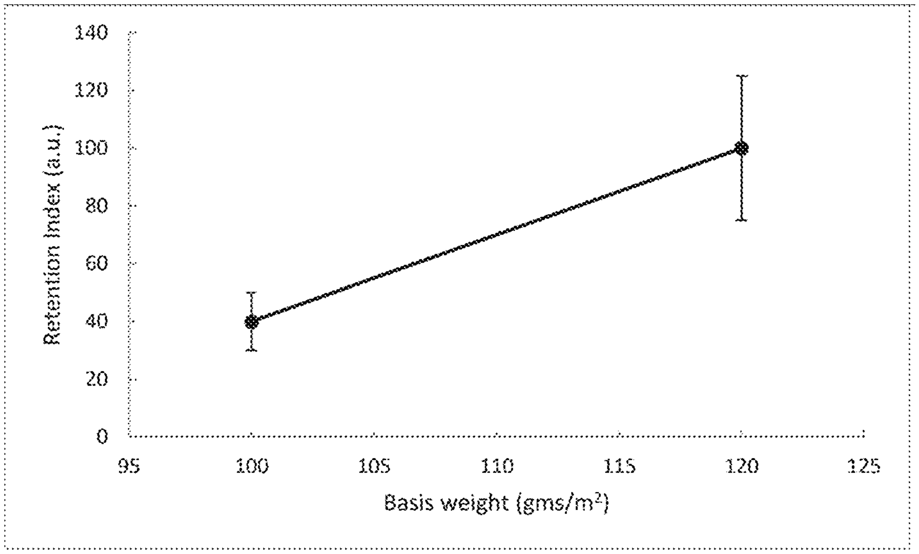
FIG. 11 plots hair retention index as a function of the basis weight of the substrate.

Basis weight is a measurement of the mass density of a fibrous substrate, and is typically expressed in $g/m^2$. For the same size substrate, the greater the basis weight, the heavier the substrate will be (e.g., as a result of greater thickness or greater density). FIG. 11 illustrates the relationship between basis weight and hair retention index.

As shown in FIG. 11, when the basis weight of the substrate is about 100, the hair retention index is about 40. When the basis weight is about 120, the hair retention index is about 100. By way of example, basis weight may be at least 80 $g/m^2$, at least 90 $g/m^2$, at least 100 $g/m^2$, from 100 $g/m^2$ to 200 $g/m^2$, or from 100 $g/m^2$ to 150 $g/m^2$. Furthermore, as noted herein, the substrate may be of a single layer, homogenous construction. For each of FIGS. 8-11, the charted values are for particles (hairs) with an aspect ratio of 3000.

Table 4 below reproduces the caliper (i.e., bulk) thickness, porosity, and basis weight characteristics of substrates A-D.

TABLE 4

| Sample | Substrate A | SWIFFER SWEEPER ® Wet Mopping Cloths (Substrate B) | Great Value ™ Disinfecting Wet Mopping Cloths (Substrate C) | PINE-SOL ® Wet Floor Wipes (Substrate D) |
|---|---|---|---|---|
| Caliper Thickness (mm) | 1.29 ± 0.02 | 2.31 ± 0.02 | 1.32 ± 0.02 | 1.18 ± 0.02 |
| Total % Porosity | 88.47 | 84.1 | 75.1 | 84.9 |
| Basis Weight ($g/m^2$) | 120 | 200 | 150 | 130 |

The low basis weight of substrate A, as well as its simplicity of construction (i.e., it is a single homogenous layer, rather than a multi-layered construction with differently configured layers) allows it to advantageously be manufactured with greater simplicity, less use of materials, and at lower cost. In addition, as apparent from the results shown in Table 1, it provides far superior results in picking up high aspect ratio particles, particularly for particles having aspect ratios greater than 1200.

e. Cleaning Composition

Many cleaning composition components as known within the art may be suitable for use in the present substrates. In an embodiment, the cleaning composition is an aqueous composition. The cleaning composition may include at least 50%, typically 90% or more of water (e.g., 90 to 99% water). The composition comprises a surface tension modifier, i.e., a component that acts to decrease surface tension of the composition. For example, water has a surface tension at ambient temperature (e.g., 25° C.) of 72 dynes/cm. The present compositions have a surface tension lower than that of water, e.g., where the decrease results from the inclusion of the surface tension modifier. Examples of such surface tension modifiers include, but are not limited to solvents and surfactants. Either the surfactant or the solvent may lower the surface tension of the cleaning composition. Alternatively, one or more surfactants and/or solvents may be combined within the cleaning composition to jointly lower the surface tension of the cleaning composition. In one embodiment, the cleaning composition includes a surfactant. In another embodiment, the cleaning composition includes a surfactant and a solvent. Such a surfactant may be present across a wide range of concentrations, e.g., from 0.1% up to 50%, although more typically less than 20%, less than 10%, or less than 5% by weight. In another embodiment, the cleaning composition includes a solvent and is free or substantially free of any surfactant. The concentration of solvent may be the same ranges as described above for surfactants. The composition may exhibit low surface tension, which is also believed to aid in facilitating pick up and retention of high aspect ratio particles. For example, the cleaning composition may have a surface tension of less than 60 dynes/cm, less than 50 dynes/cm, less than 40 dynes/cm, less than 30 dynes/cm, less than 20 dynes/cm, or the like.

In some embodiments, a quaternary ammonium compound may be included. Such an antimicrobial quaternary amine compound may comprise from 0.05% to 5% by weight of the cleaning composition. Various solvents or various other adjuvants often included in cleaning compositions may also optionally be present.

Non-limiting examples of quaternary ammonium compounds are typically halides (e.g., a chloride) of alkyldimethylbenzylammonium, alkyldimethylethylbenzylammonium, alkyldimethylammonium, or the like. The alkyl groups of such quaternary ammonium compounds may typically range from $C_{12}$ to $C_{18}$. Quaternary ammonium compounds are described in more detail in U.S. Pat. No. 6,825,158, incorporated by reference herein, and will already be familiar to those of skill in the art. Such quaternary ammonium compounds may serve as antimicrobial agents, and/or as surfactants.

The cleaning composition may include a solvent, such as a glycol ether, an amino alcohol (e.g., ethanolamine), lower alcohols (e.g., $C_1$-$C_4$ alcohols), combinations thereof, or the like. The solvent may be included from 0.1%, from 0.25%, up to 5%, up to 4%, up to 3%, up to 2%, or up to 1% by weight of the cleaning composition. While such components are not traditionally termed surfactants or surface tension modifiers, they can serve the purpose of surface tension modification as described herein.

Those of skill in the art will appreciate that any among a wide variety of surfactants (e.g., anionic, cationic, non-ionic, zwitterionic, and/or amphoteric) may be included in the cleaning composition, as desired. Listings of exemplary components traditionally characterized as surfactants are included within various of the patents and other publications that will be familiar to those of skill in the art. Examples of such include U.S. Pat. Nos. 3,929,678; 4,259,217; 6,825,158; 8,648,027; 9,006,165; 9,234,165, and U.S. Publication No. 2008/003906, each of which is herein incorporated by reference in its entirety. Non-limiting more specific examples of suitable surfactants include, but are not limited to alcohol ethoxylates, alkyl amine oxides, alkyl polyglycosides (also referred to as alkyl polyglucosides), alkyl sulfates, ethoxylated alkyl sulfates, sulfosuccinates, alkyl sulfites, combinations thereof, and the like. Alkyl groups may typically have from 12 to 18 carbon atoms. Any suitable cationic species (e.g., sodium, potassium, ammonium, or the like) may be used in such surfactants.

The cleaning composition may be of any desired pH. In an embodiment, pH may be from 2 to 12, from 2 to 8, from 9 to 12, or from 10 to 12.

Figure 12:
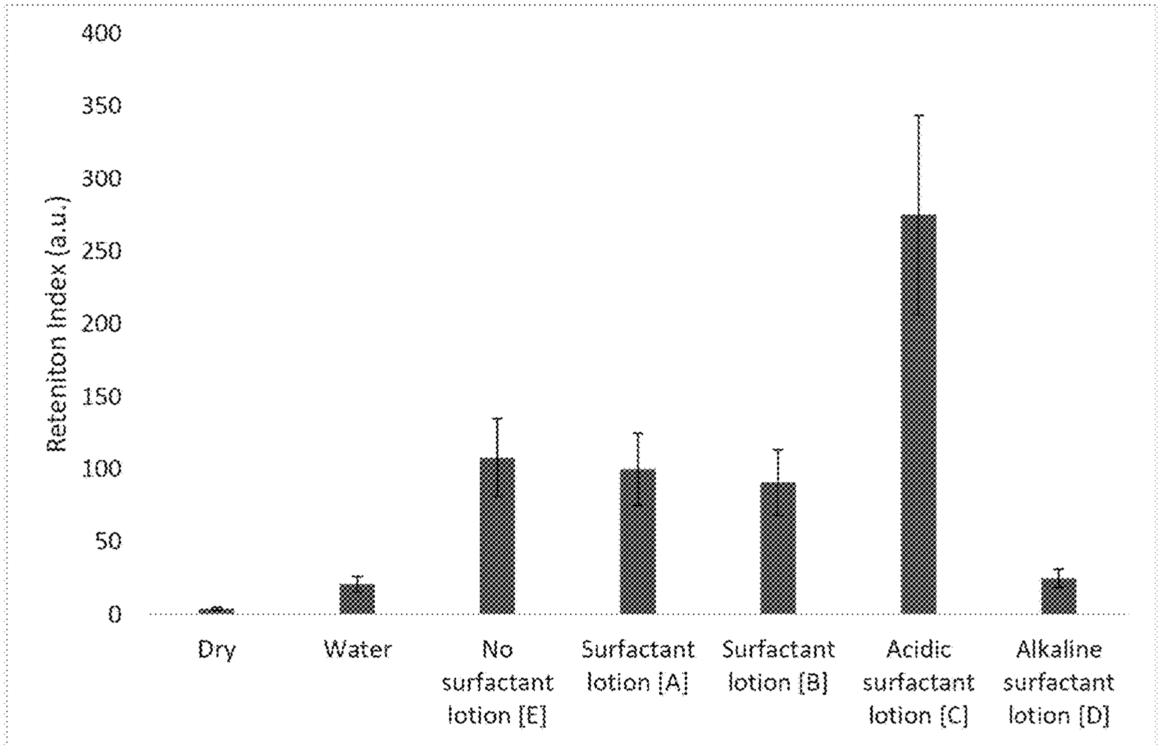
FIG. 12 is a histogram chart showing hair retention indexes for a dry substrate, compared to the same substrate wetted with water, compared to the same substrate wetted with cleaning compositions including water and other ingredients.

Exemplary cleaning composition formulations are shown below in Tables 5A-5D. The formulations in Tables 5A-5E correspond to the lotions for which results are shown in FIG. 12. Table 5A corresponds to surfactant lotion [A]. Table 5B corresponds to surfactant lotion [B]. Table 5C corresponds to acidic surfactant lotion [C], which had a pH of 2-3. Table 5D corresponds to alkaline surfactant lotion [D], which had a pH of 11. Table 5E corresponds to lotion [E], which does not include a surfactant, but includes a solvent which serves as a surface tension modifier. The terms "lotion" and "cleaning composition" are used interchangeably herein.

TABLE 5A

| Component | Function | Weight Percent |
|---|---|---|
| Water | Diluent | 90-99% |
| Diethylene Glycol Monoethyl Ether | Solvent | 0.1-3% |
| Quaternary Ammonium Compound | Disinfectant | 0.1-2% |
| Isopropyl Alcohol | Solvent | 0.1-2% |
| Lauryl Dimethylamine Oxide | Surfactant | 0.05-1% |
| Fragrance | Fragrance | 0.05-1% |

TABLE 5B

| Component | Function | Weight Percent |
|---|---|---|
| Water | Diluent | 90-99% |
| Diethylene Glycol Monoethyl Ether | Solvent | 0.1-3% |
| Isopropyl Alcohol | Solvent | 0.1-2% |
| Lauryl Dimethylamine Oxide | Surfactant | 0.05-1% |
| Dye/Fragrance | Dye/Fragrance | 0.005-1% |

TABLE 5C

| Component | Function | Weight Percent |
|---|---|---|
| Water | Diluent | 90-99% |
| Citric Acid | pH Adjuster | 0.1-3% |
| Alkyl polyglucoside | Surfactant | 1-4% |
| Fragrance | Fragrance | 0.001-0.1% |

TABLE 5D

| Component | Function | Weight Percent |
|---|---|---|
| Water | Diluent | 90-99% |
| Lauryl Diethyl Benzyl Ammonium Chloride | Surfactant | 1-5% |
| Alkyl Dimethyl Benzyl Ammonium Chloride | Surfactant | 0-1% |
| Monoethanolamine | Solvent | 0.01-2% |
| Tetrapotassium EDTA | Chelating Agent | 0.01-1% |
| Fragrance | Fragrance | 0.001-0.1% |
| Dye | Dye | 0-0.1 |

TABLE 5E

| Component | Function | Weight Percent |
|---|---|---|
| Water | Diluent | 25-40% |
| Ethylene Glycol | Surface Tension Modifier | 60-75% |

Table 6 below reports retention index values, and surface tension values, associated with each of lotions [A] through [E].

TABLE 6

| Composition | Retention Index | Lotion Surface Tension (dynes/cm) |
|---|---|---|
| Dry | 4 | N/A |
| Water Alone | 21 | 72.8 |
| Lotion [A] | 100 | 32.9 |
| Lotion [B] | 91 | 27.9 |
| Lotion [C] | 275 | 27.7 |
| Lotion [D] | 12 | 28.6 |
| Lotion [E] | 108 | 50 |

Applicant has discovered that the inclusion of a surfactant or other surface tension modifier within the cleaning composition also aids in providing the desired particle pick up and retention characteristics. Those of skill in the art will appreciate that surfactants lower the surface tension (or interfacial tension) between two liquids, between a gas and a liquid, or between a liquid and a solid. Applicant has surprisingly discovered that having a surface tension of less than about 50 dynes/cm, with or without inclusion of a component traditionally termed a "surfactant", not only may improve cleaning efficacy but also appears to increase hair pick up and retention capability of the dosed cleaning substrate as apparent from FIG. 12. As noted above, the surface tension of the cleaning composition may be less than 50 dynes/cm, or less than 40 dynes/cm.

FIG. 12 is a histogram chart, showing hair retention indexes for a dry substrate A (which has a relatively low retention index, e.g., perhaps ~5) as compared to the same substrate wetted with water (which has a moderate retention index of ~20). Where the substrate is loaded with a cleaning composition including both water and some type of surface tension modifier, the retention index is higher, e.g., at least 30, at least 40, at least 50, or about 100 or higher. It is noted that even though lotion [E] included no component typically regarded as a surfactant, the ethylene glycol solvent/surface tension modifier included therein was able to provide a similarly increased retention index, e.g., of about 100 as several of the other exemplary compositions. The retention index of lotion [C] was particularly high.

Figure 16:
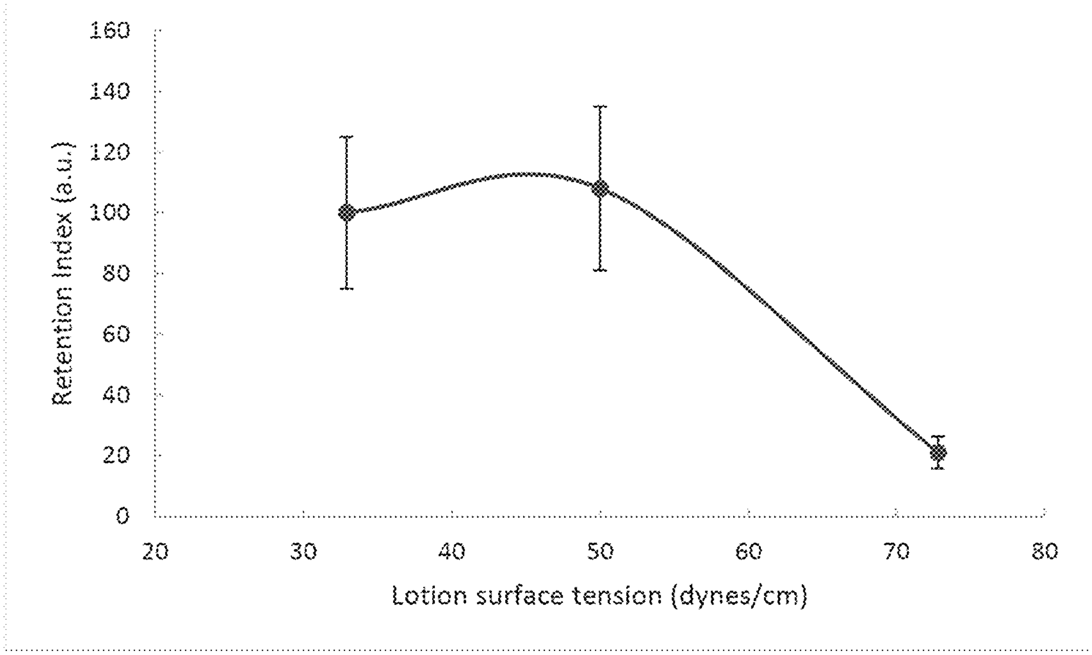
FIG. 16 is a plot of retention index vs. lotion surface tension showing a significant drop off in retention index starting at a surface tension of 50 dynes/cm.

FIG. 16 illustrates the relationship between surface tension of the cleaning composition or lotion and hair retention index. As seen in FIG. 16, there is a significant drop off in retention index when surface tension increases to above 50 dynes/cm. As such, the cleaning composition may be formulated to ensure that the surface tension is less than 60 dynes/cm, or more preferably less than 50 dynes/cm. Values between 30 dynes/cm and up to 60 dynes/cm, from 40 dynes/cm to 60 dynes/cm, or from 40 dynes/cm to 50 dynes/cm may be particularly suitable, as they correlate to very high retention index values.

Applicant has discovered that hair pick up does not appear to be an electrostatic phenomenon, but rather appears to be an effect of the physical characteristics of the substrate of the contact surface of the substrate that contacts the floor during mopping, as well as the compositional characteristics (e.g., including surface tension) of the cleaning composition employed. Applicant found no significant interference between surface tension and inclusion of a cationic quaternary ammonium antimicrobial compound, which result was somewhat surprising. For example, it was thought that perhaps the inclusion of a cationic antimicrobial compound may interfere with low surface tension by preferentially adsorbing on cellulosic fibers, reducing the ability to effectively and efficiently pick up and retain hair in the dosed substrate. Such was advantageously found to not be the case.

In an embodiment, the cleaning composition may include little or no oil component. For example, some existing floor cleaning compositions are emulsions (e.g., an oil-in water emulsion. In an embodiment, the present cleaning compositions are not macroemulsions, as they include little if any oil component. For example, the only oil component may be a fragrance, which may typically be present, if at all, in an amount of not more than about 1%. Such an oil level is very low, and insufficient to result in a macroemulsion (characterized by ≥1 μm domain size) within the cleaning composition as a whole. Optionally, a thickening ingredient may also be added to the lotion, but such not needed for optimal hair pick up. For example, viscosity may be relatively low, e.g., less than 1000 cps, less than 100 cps, or less than 10 cps. Of course, in thickened compositions, far higher viscosities are possible.

Table 7 below shows cleaning composition characteristics for the tested substrates of Table 1 relative to the testing results seen with substrates A-D.

TABLE 7

| Sample | Substrate A | SWIFFER SWEEPER ® Wet Mopping Cloths (Substrate B) | Great Value ™ Disinfecting Wet Mopping Cloths (Substrate C) | PINE-SOL ® Wet Floor Wipes (Substrate D) |
|---|---|---|---|---|
| Cleaning Composition | A | B | C | D |
| Fine Particle Pick Up (Vacuum Dust) | High | High | High | High |
| Coarse Particle Pick Up (Sand) | Medium | Low | High | Low |
| Pick Up of L/D Aspect Ratio = 300 | High | High | High | High |
| Pick Up of L/D Aspect Ratio = 1200 | High | Low | Low-Medium | Low |
| Pick Up of L/D Aspect Ratio = 3000 | High (84%) | Low (~1%) | Medium (~52%) | Low (~1%) |

Substrate A was loaded with a cleaning composition such as that seen in Table 5A. Substrate B was loaded with a non-disinfecting cleaning composition, such as that suggested for use by the commercial supplier of Substrate B. Substrate C was loaded with a cleaning composition that included a quaternary amine antimicrobial. Substrate D was loaded with a PINE-SOL® based lotion, a commercially available cleaning composition intended for floor cleaning. As is apparent from the results in Tables 1 and 7, excellent particle pick up characteristics of high aspect ratio particles is possible when using the particular combination of a cleaning composition as described herein, with a substrate having characteristics such as those of Substrate A.

Figure 13A:
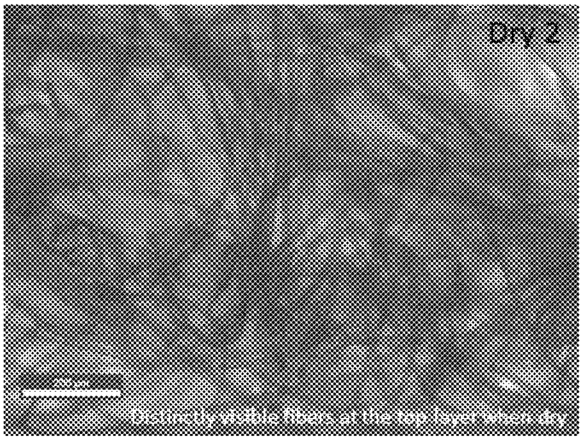
FIGS. 13A-13B are microscope images of substrate A tested dry and wet with surfactant lotion [A] showing the interaction between the individual substrate fibers and the surfactant lotion [A].
Figure 13B:
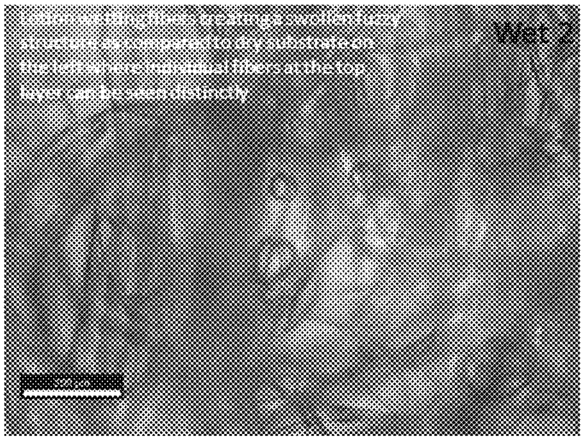

FIGS. 13A-13B show microscope images of dry and wet configurations for substrate A. The dry substrate image shows more defined fibers with cleaner lines. In contrast, the wet substrate images shows that the fibers in the substrate have swollen and have become fuzzier or less clearly defined. The wet substrate images also show how the surfactant is stabilized (e.g., trapped) with air bubbles, in the wet swollen fiber structure. In FIGS. 13A and 13B, Substrate A was wetted with surfactant lotion [A]. As shown in FIGS. 13A and 13B, the surfactant containing composition forms stabilized air bubbles, which become trapped in the fibers. These trapped bubbles and the loose, loopy, wavy fiber structure are visible in FIGS. 13A and 13B. These Figures illustrate clearly how the surfactant lotion interacts with the fibers of the substrate and alters the nature (e.g. swollen fibers) and special relationship of the fibers (e.g. fibers move within the substrate to accommodate the stabilized surfactant).

FIGS. 14A-14D show microscope images of dry (FIGS. 14A and 14C) and wet (FIGS. 14B and 14D) configurations for substrate A. The dry substrate images show groups of fibers in the substrate that are more evenly distributed. In contrast, the wet substrate images show that groups of fibers are collapsing together and adjacent areas of the substrate have fewer fibers, which creates wider pores or gaps in the overall substrate. The wet substrate images show a more open structure that facilitates improved particle pickup and retention. FIGS. 14C and 14D include gap measurements between adjacent fibers, showing how in the dry configuration (FIG. 14C) these particular fibers were measured to be 129 μm and 134 μm apart, at particular locations. In the wet configuration (FIG. 14D), these same fibers measured at the same relative locations were now 172 μm and 176 μm apart, indicating a gap widening of about 30% to 35%. The wider pores or gaps in the wet substrate create spaces that help to trap and retain particles. The combined effect of having specific fibers that are swollen and more attractive to particles in addition to a substrate structure that responds to a substrate lotion by widening pores that help trap and retain the particles had a significant and surprising impact on improving particle pick up performance overall.

FIGS. 15A-15B include quantitative data characterizing the effect of the contemplated cleaning compositions on the substrate, such as those characteristics illustrated in FIGS. 13A-13B, and 14A-14D. In particular, FIGS. 15A-15B show histograms of 8-bit grayscale values (0-255) for the images seen in FIGS. 14A-14B, respectively. Thus, FIG. 15A shows 8-bit grayscale values for the particular location of the substrate seen in FIG. 14A, in its dry configuration. FIG. 15B shows 8-bit grayscale values for the same location of the same substrate, but in the wet configuration (as seen in FIG. 14B).

Such image analysis was performed using ImageJ software. ImageJ is a public domain image processing tool developed by National Institutes of Health (NIH). Such a method of image analysis may include loading the gray scale image of the substrate into ImageJ, and selecting the particular region to be analyzed using the selection tool. Alternatively, the entire image could be analyzed, where the image represents the desired region to be analyzed. The ImageJ tool "Plot profile analysis" can be run on any selected region, which reports a median gray value (between 0 and 255) for the particular selection. In such scale, the "0" value corresponds to full black, while the "255" value corresponds to full "white", and all values in between correspond to various shades of gray within the 8-bit resolution.

For example, a substrate region dense with fibers will have a mean grayscale value that is lower than a region in which the fiber density is lower, or more "open". FIGS. 15A-15B show the respective grayscale histograms for the same substrate region, in both its dry (FIG. 15A) and wet (FIG. 15B) configuration. When wetted, the mean grayscale value of 126.4 is greater than the mean grayscale value of 111.5 when the same substrate region is dry. Such a difference is attributable to the fact that when wetted, the substrate fibers undergo a structural rearrangement that effectively causes a more "open" surface structure provided by the fibers. As explained earlier, this increased openness in the substrate structure increases the tendency for high aspect ratio soil or debris particles such as hair to be drawn into the substrate and entangled with the fibers.

Table 8 below reproduces the particle pick up results of substrate A as compared to comparative substrates B-D.

TABLE 8

| Sample | Substrate A | SWIFFER SWEEPER ® Wet Mopping Cloths (Substrate B) | Great Value ™ Disinfecting Wet Mopping Cloths (Substrate C) | PINE-SOL ® Wet Floor Wipes (Substrate D) |
|---|---|---|---|---|
| Fine Particle Pick Up (Vacuum Dust) | High | High | High | High |
| Coarse Particle Pick Up (Sand) | Medium | Low | High | Low |
| Pick Up of L/D Aspect Ratio = 300 | High | High | High | High |
| Pick Up of L/D Aspect Ratio = 1200 | High | Low | Low-Medium | Low |
| Pick Up of L/D Aspect Ratio = 3000 | High (84%) | Low (~1%) | Medium (~52%) | Low (~1%) |

It will be apparent from Table 8 that substrate A outperforms the existing comparative floor cleaning substrates B-D, particularly in picking up particles with L/D ratios greater than 1200. In particular, at particle L/D aspect ratios greater than 3000, substrate A is particularly effective, picking up 84% of such particles, which is far better than the best comparative substrate (substrate C), which picked up about 52% of particles having a L/D aspect ratio of 3000. Substrates B and D only picked up about 1% of such particles.

f. Single-Layer and Stiffness Characteristics

The substrates according to the present invention may be formed to have a homogeneous fiber composition, throughout just a single layer structure. Such a single layer homogenous structure differs from most existing floor mopping systems that include multi-layered substrates that are inherently heterogeneous, as each layer is intentionally differently configured to provide different benefits.

Figure 17:
FIG. 17 plots absorbance as a function of wavenumber for a first face of three areas of tested substrate A.
Figure 18:
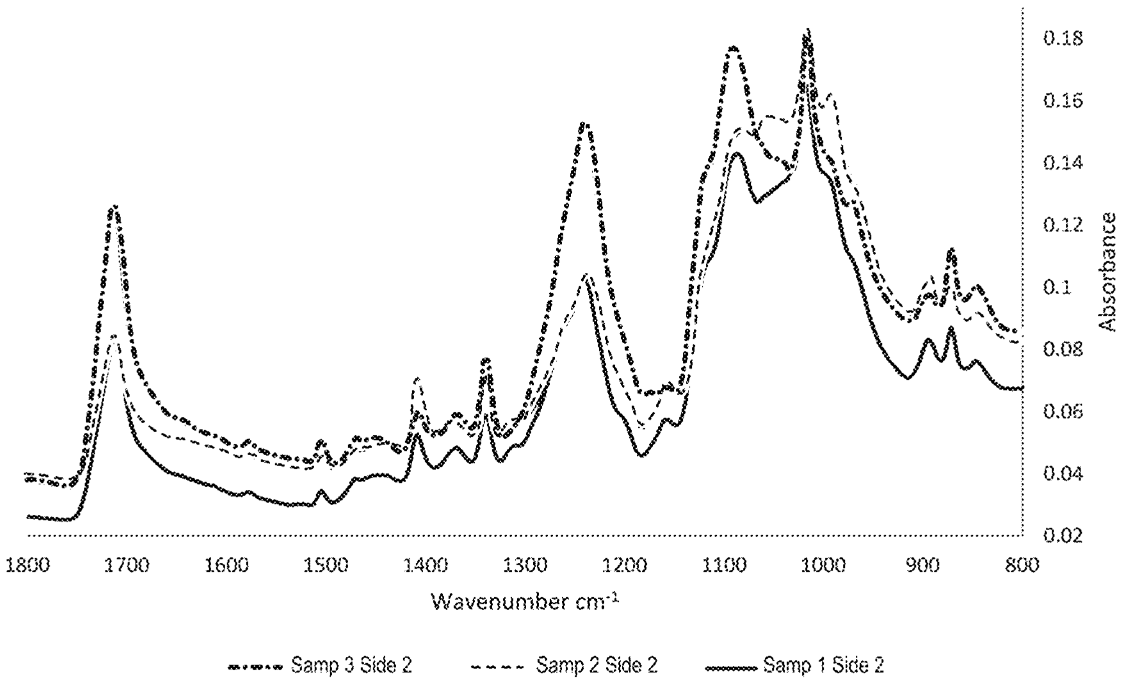
FIG. 18 plots absorbance as a function of wavenumber for a second face of three areas of tested substrate A.

FIGS. 17 and 18 show Fourier-transform infrared spectroscopy (FTIR) absorption data for three different samples of substrate A. FIG. 17 shows absorption as a function of wavenumber taken at one face for samples 1-3, while FIG. 18 shows absorption as a function of wavenumber taken at the opposite face of samples 1-3. As is apparent from FIGS. 17-18, the absorption characteristics of each side of the substrate are similar to one another.

Table 9 below reproduces the structural and stiffness characteristics of substrates A-D.

TABLE 9

| Sample | Substrate A | SWIFFER SWEEPER ® Wet Mopping Cloths (Substrate B) | Great Value ™ Disinfecting Wet Mopping Cloths (Substrate C) | PINE-SOL ® Wet Floor Wipes (Substrate D) |
|---|---|---|---|---|
| Structure | Single Layer | 3-Layer | 2-Layer | Singler Laye |
| Stiffness (mg · cm) | 357 | 3465 | 1903 | 5057 |

According to Table 9, the single layer of substrate A has far lower stiffness as compared to substrates B-D.

g. Other Characteristics

The size and shape of the substrate can vary with respect to the intended application and/or end use of the same. The cleaning substrate can have a substantially rectangular shape of a size that allows it to readily engage standard cleaning equipment or tools such as, for example, mop heads, duster heads, brush heads, mitten shaped tools for wiping or cleaning, and so forth.

The wipes or other cleaning substrates can be provided pre-moistened with a cleaning composition. In one embodiment, the cleaning composition comprises water and a surfactant, or another surface tension modifier. In addition to water and a surface tension modifier, such composition may include an antimicrobial agent, to provide sanitization or disinfection, and or a solvent, such as an alkanolamine. In some embodiments, an antimicrobial agent (e.g., a quaternary amine) may serve both as an antimicrobial function and as a surface tension modifier. In another embodiment, the cleaning composition comprises water and a solvent and is free of any components that may traditionally be termed "surfactants" (e.g., alcohol ethoxylates, alkyl amine oxides, alkyl polyglycosides (also referred to as alkyl polyglucosides), alkyl sulfates, ethoxylated alkyl sulfates, sulfosuccinates, alkyl sulfites, and the like). The pre-dosed cleaning substrates can be maintained over time in a sealable container such as, for example, within a bucket or tub with an attachable lid, sealable plastic pouches or bags, canisters, jars, and so forth. In another embodiment, the substrate could be provided dry, for dosing by the consumer at the time of use.

In some embodiments, the substrate may be implemented into a cleaning system, which includes a handle and/or a cleaning head. The cleaning head may be attached or attachable to the handle. The exemplary substrate may be loaded with a cleaning composition and attached to the cleaning head before or at the time of use. Users may hold the handle and/or the cleaning head to mop a hard surface. The exemplary substrate loaded with the cleaning composition in contact with the cleaning surface may pick up more than 50%, more than 60%, more than 70%, or more than 80% of particles with a L/D aspect ratio of at least 300, at least 500, at least 600, at least 1000, at least 1200, at least 1500, at least 2000, at least 2500, or at least 3000. Very high particle pick up values (e.g., greater than 80%, such as at least 85%, at least 90%, or at least 95%) may be provided for the relatively lower L/D aspect ratios, such as 300, 500, 600, or 1000. The particles picked up by the loaded substrate may be retained at a high hair retention index (e.g., at least 20, e.g., at least 25, at least 30, at least 40, at least 50, at least 60, such as 20 to 200, 20 to 150, 20 to 100, or the like) so that the particles remain on the substrate even when the user lifts the cleaning system to move from one room to another, to remove a fully expended substrate, or the like.

Without departing from the spirit and scope of this invention, one of ordinary skill can make various changes and modifications to the invention to adapt it to various usages and conditions. As such, these changes and modifications are properly, equitably, and intended to be, within the full range of equivalence of the following claims.

The invention claimed is:

1. A pre-loaded cleaning substrate comprising, (i) a substrate with a basis weight of greater than 100 $g/m^2$ and an air permeability of at least 46 $ft^3$/min; and (ii) a cleaning composition loaded onto the substrate comprising:

(a) a quaternary ammonium compound; and (b) a surface tension modifier comprising at least one of a glycol ether, an alcohol, or an amine oxide; and (c) water, wherein the pre-loaded cleaning substrate comprises fibers with an average fiber diameter of about 10 μm to about 15 μm, wherein the pre-loaded cleaning substrate picks up more than 80% of particles with an L/D aspect ratio of at least 3000;

wherein the pre-loaded cleaning substrate has a retention index greater than 20 and the cleaning composition has a surface tension of less than 40 dynes/cm.

2. The pre-loaded cleaning substrate of claim 1, wherein the pre-loaded cleaning substrate has an air permeability from 46 $ft^3$/min to about 75 $ft^3$/min.

3. The pre-loaded cleaning substrate of claim 1, wherein the pre-loaded cleaning substrate has an air permeability from 46 $ft^3$/min to about 60 $ft^3$/min.

4. The pre-loaded cleaning substrate of claim 1, wherein the pre-loaded cleaning substrate is a single layer substrate.

5. The pre-loaded cleaning substrate of claim 1, wherein the pre-loaded cleaning substrate has an average surface roughness of at least 400 μm and picks up more than 50% of particles with a L/D aspect ratio between about 300 and about 3000.

6. The pre-loaded cleaning substrate of claim 1, wherein the pre-loaded cleaning substrate has an average surface roughness of at least 400 μm and picks up more than 80% of particles with a L/D aspect ratio between about 300 and about 1200.

7. The pre-loaded cleaning substrate of claim 1, wherein the pre-loaded cleaning substrate comprises two or more layers comprising a surface contact layer and a backing layer, wherein the surface contact layer comprises fibers with an average fiber diameter of about 10 μm to about 15 μm and the pre-loaded cleaning substrate has an air permeability from 46 $ft^3$/min to about 60 $ft^3$/min and an average surface roughness of at least 400 μm.

8. The pre-loaded cleaning substrate of claim 1, wherein the cleaning substrate has an average surface roughness of at least 450 μm.

9. The pre-loaded cleaning substrate of claim 1, wherein the cleaning substrate has an average surface roughness of at least 400 μm.

10. The pre-loaded cleaning substrate of claim 1, wherein the pre-loaded cleaning substrate picks up more than 40% of particles with a L/D aspect ratio of at least 1200.

11. The pre-loaded cleaning substrate of claim 1, wherein the pre-loaded cleaning substrate picks up more than 60% of particles with a L/D aspect ratio of at least 1200.

12. The pre-loaded cleaning substrate of claim 1, wherein the pre-loaded cleaning substrate picks up more than 40% of particles with a L/D aspect ratio of at least 300.

13. A pre-loaded cleaning substrate comprising, (i) a substrate with a basis weight of greater than 100 $g/m^2$ and an air permeability of at least 46 $ft^3$/min; and (ii) a cleaning composition loaded onto the substrate comprising:

(c) a quaternary ammonium compound; and (d) a surface tension modifier comprising at least one of a glycol ether, an alcohol, or an amine oxide; and (c) water, wherein the pre-loaded cleaning substrate has a retention index greater than 20 and picks up more than 80% of particles with an L/D aspect ratio of at least 3000;

wherein the cleaning composition has a surface tension of less than 40 dynes/cm.

14. The pre-loaded cleaning substrate of claim 13, wherein the pre-loaded cleaning substrate is a single layer substrate with a homogeneous fiber composition.

15. The pre-loaded cleaning substrate of claim 13, wherein the pre-loaded cleaning substrate has a stiffness of about 100 mg cm to about 1000 mg cm.

16. A pre-loaded cleaning substrate comprising, (i) a substrate with a basis weight of greater than about 100 $g/m^2$ and an air permeability from about 46 $ft^3$/min to about 75 $ft^3$/min; and (ii) a cleaning composition loaded onto the substrate comprising:

(a) a quaternary ammonium compound; and (b) a surface tension modifier comprising at least one of a glycol ether, an alcohol, or an amine oxide; and (c) water, wherein the pre-loaded cleaning substrate comprises fibers with an average fiber diameter of about 10 μm to about 15 μm, wherein the pre-loaded cleaning substrate picks up more than about 80% of particles with an L/D aspect ratio of at least 3000;

wherein the pre-loaded cleaning substrate has a retention index greater than 20 and the cleaning composition has a surface tension of less than 40 dynes/cm.

* * * * *